Aug. 8, 1967 L. HÄKKÄ 3,334,678

SKID-RESISTANT MEANS FOR PNEUMATIC TIRES

Filed April 8, 1965

INVENTOR:
L. Häkkä
BY
Richards & Geier
ATTORNEYS

United States Patent Office 3,334,678
Patented Aug. 8, 1967

3,334,678

SKID-RESISTANT MEANS FOR PNEUMATIC TIRES

Lennart Häkkä, Helsinki, Finland, assignor to Oy Kovametalli AB, Lintuvaara, Finland, a corporation of Finland Filed Apr. 8, 1965, Ser. No. 446,694
Claims priority, application Finland, Apr. 13, 1964, 775/64
4 Claims. (Cl. 152—210)

This invention relates to skid-resistant means adapted to be embedded in pneumatic tires, said means comprising a hard-metal tip-piece encircled by a body member. Heretofore, prior art has produced various kinds of skid-resistant means of the stated kind differing in shape and body member material. The body member has generally been of metal but the use of plastic as body member is also old. However, all such prior art skid-resistant means have proved unsatisfactory in that in use the body member gradually wears down to the degree that the skid-resistant means is broken. This wearing down is due to the fact that when the vehicle is being driven the skid-resistant means will always move and rub against the tire material and this wearing down action is even enhanced by dust and like particles possibly found between the body member and the tire material. For this reason it has been necessary to make the body member relatively thick, which in turn leads to drawbacks of its own.

This invention has for its object to provide skid resistant means without the aforementioned drawbacks. The novel feature of the invention resides in that the face or surface of the body member is made wear-resistant by means of case hardening, nitride hardening, coating or other prior known method. Thus the face of the body member is made so hard that the skid-resistant means will remain unbroken in the tire for an adequate period of time.

Preferably the hardened top layer of the body member is also coated with a softer layer in order to minimize the wear of the tools used in embedding the skid-resistant means into the tire. In the preferred embodiment of the invention the steel body of the skid-resistant means is first provided with a wear-resistant layer by nitride hardening and then by coating the thus obtained first layer with a softer second layer, e.g., a zinc layer or a cadmium layer. Such a zinc or cadmium layer will also provide protection against corrosion.

As has been mentioned already the body member face may also be made wear-resistant by coating means, which can be done by galvanization. Preferably the body member is chromeplated and then too, it may be necessary to use intermediate layers as is often done in galvanisation. In some instances coating of the body member is preferred to case hardening because coating not only provides the body member with a harder face or surface but also prevents corrosion of the body member.

When the face or surface of the skid-resistant means has been made hard the wear down of the body member is so small that the skid-resistant means will stay effective in the tire an adequate period of time, which is a notable economical advantage. When the body member is provided with a hard surface or face the body member can be made thinner than heretofore. From this it follows that the skid-resistant means will be lighter in weight than heretofore which is an advantage. Then too, the centrifugal force directed at the skid-resistant means during driving will be appreciably smaller than heretofore, so that the skid-resistant means will stay securely in place in the tire.

The body member may be made of heavy or light metal or of other material than metal, such as plastics, provided that the body member possesses the requisite strength. It is to be understood that the invention is not limited to the above stated methods of hardening and coating the body member since methods other than those stated may be used, the main thing being that the face or surface of the body member is made very resistant to wear. The coating of the body member may also be carried out by spraying, instead of galvanisation.

The invention is illustrated in the appended drawing, wherein.

Figure 1:
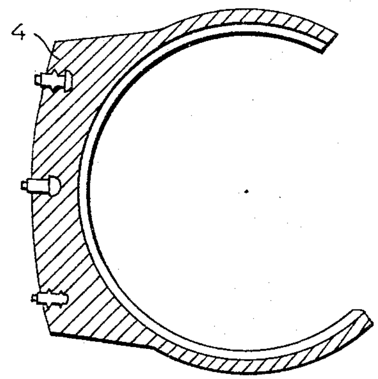
FIGURE 1 is a cross section through a tire provided with three different types of studs.
Figure 2:
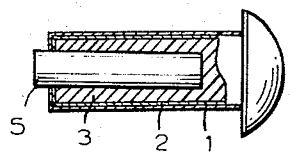
FIGURE 2 shows in section, partly in side view on an enlarged scale, a stud in a tire.
Figure 3:
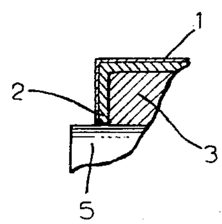
FIGURE 3 is an enlarged sectional view of the encircled portion of FIG. 2.

The drawings show a tire 4 with studs extending from the tread surface. Each stud includes a hard metal tip member 5, a stud body 3 enclosing the tip member 5, a hard layer 2 and an outer soft layer 1 which may consist of a zinc or cadmium coating.

As already stated, various changes may be made in the illustrated construction within the scope of the present invention.

I claim:

1. For insertion into a ready made tire, a skid-resistant member comprising a hard-metal tip piece and a body member enclosing said tip piece, said body member having a treated wear-resistant hardened surface located within the tire.

2. A skid-resistant member in accordance with claim 1, comprising a softer layer located upon said hardened surface.

3. A skid-resistant member in accordance with claim 1, wherein said hardened surface is case-hardened.

4. A skid-resistant member in accordance with claim 1, wherein said hardened surface is nitride-hardened.

References Cited

UNITED STATES PATENTS

| | | | |
|---|---|---|---|
| 1,552,041 | 9/1925 | Crapo | 148—16.6 |
| 3,125,147 | 3/1964 | Häkkä | 152—210 |
| 3,220,455 | 11/1965 | Sowko | 152—210 |

ARTHUR L. LA POINT, *Primary Examiner.*

C. W. HAEFELE, *Assistant Examiner.*